(12) United States Patent
Yoshida et al.

(10) Patent No.: US 6,390,924 B1
(45) Date of Patent: May 21, 2002

(54) POWER TRANSMISSION SHAFT AND CONSTANT VELOCITY JOINT

(75) Inventors: Kazuhiko Yoshida; Akira Wakita; Hiroaki Makino; Hideki Kondou, all of Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/468,328

(22) Filed: Dec. 21, 1999

(30) Foreign Application Priority Data

| Jan. 12, 1999 | (JP) | ............................................. 11-005574 |
| Jan. 27, 1999 | (JP) | ............................................. 11-018840 |
| Feb. 1, 1999 | (JP) | ............................................. 11-024014 |

(51) Int. Cl.$^7$ ................................................. F16D 3/26
(52) U.S. Cl. ....................................... 464/111; 464/902
(58) Field of Search ............................... 464/145, 146, 464/906, 903, 111

(56) References Cited

U.S. PATENT DOCUMENTS

| 4,396,442 A | * | 8/1983 | Nakamura et al. | ............ 148/614 |
| 4,596,606 A | * | 6/1986 | Kovacs et al. | ............... 148/545 |
| 4,666,533 A | * | 5/1987 | Kovacs et al. | ............... 148/543 |
| 4,880,477 A | * | 11/1989 | Hayes et al. | ................. 148/545 |
| 5,028,281 A | * | 7/1991 | Hayes et al. | ................. 148/321 |
| 5,043,028 A | * | 8/1991 | Kovacs et al. | ............... 148/321 |
| 5,139,579 A | * | 8/1992 | Kovacs et al. | ............... 148/545 |
| 5,779,551 A | * | 7/1998 | Stall et al. | .................... 464/111 |
| 5,788,578 A | * | 8/1998 | Shimizu et al. | ............. 464/145 |
| 5,791,995 A | * | 8/1998 | Kudo et al. | .................. 464/111 |
| 5,830,285 A | * | 11/1998 | Katayama et al. | .......... 148/320 |
| 5,837,069 A | * | 11/1998 | Deards et al. | .............. 148/323 |
| 5,855,519 A | * | 1/1999 | Kadota | ......................... 464/145 |
| 5,910,223 A | * | 6/1999 | Tipton et al. | ................ 148/210 |

* cited by examiner

Primary Examiner—Lynne H. Browne
Assistant Examiner—Aaron M Dunwoody
(74) Attorney, Agent, or Firm—Arent Fox Kintner Plotkin & Kahn, PLLC (57) ABSTRACT

A power transmission shaft using the constant velocity joint is manufactured by applying induction hardening to graphite steel thereby to harden the surface layer and form a 2-phase structure of ferrite and martensite in the core thereof. The graphite steel contains 0.35 to 0.70% of C, 0.4 to 2.0% of Si, 0.3 to 1.5% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

31 Claims, 7 Drawing Sheets

| Friction coefficient $\mu$ | Thickener | Comparison of wear |
|---|---|---|
| 0.119 | Li-type | × |
| 0.098 | Li-type | △ |
| 0.079 | Urea-type | △ |
| 0.070 | Urea-type | ○ |
| 0.056 | Urea-type | ○ |

| Friction coefficient $\mu$ | Thickener | Comparison of wear |
|---|---|---|
| 0.093 | Li-type | △ |
| 0.081 | Urea-type | △ |
| 0.070 | Urea-type | ○ |
| 0.054 | Urea-type | ○ |

POWER TRANSMISSION SHAFT AND CONSTANT VELOCITY JOINT

BACKGROUND OF THE INVENTION

The present invention relates to a power transmission shaft used in apparatuses such as automobiles and industrial machines to transmit torque via a constant velocity joint. The present invention also relates to a constant velocity joint used in apparatuses such as automobiles and industrial machines to transmit driving power.

A power transmission shaft, for example the drive shaft of an automobile, is usually made of carbon steel or carburized steel, and is ensured to have a specified strength by setting proper surface hardening and effective case depth achieved by a heat treatment.

Recently, as the automobiles tend to have increasing output power and the vehicle weight increases for higher safety requirements, the drive shaft is required to have higher strength. On the other hand, the drive shaft is required to be lighter in weight in order to improve the fuel efficiency, that also imposes a pressing need to increase the strength of the drive shaft.

In order to increase the load capacity of the shaft, it is common to increase the carbon content of the material thereby to achieve a higher material strength or increase the effective depth of hardened layer (case depth). However, the former approach leads to decreased strength in notched parts, and lower workability, such as the ease of forging and cutting, due to the increased hardness of the material. The latter approach, on the other hand, leads tot very narrow range of case depths that can be obtained in the case of carburized steel. Also in the case of a shaft made of carbon steel, it becomes more difficult to apply deep hardening as the shaft diameter increases, and it is very difficult to carry out deep hardening with the ratio of effective case depth to shaft radius (hereinafter denoted $\gamma$) higher than 0.4 since it may lead to defects such as quenching crack. Recently carbon steel that contains boron B added has been used to enable deep hardening. However, even though the effective case depth is increased with the use of this material, only an increase in the strength up to about 15% is possible since the static strength and the torsional fatigue strength reach the plateau at $\gamma>0.65$ and $\gamma>0.5$, respectively (Japanese Patent Application Laid-open No. Hei 5-320825). Also in the case of a material with B added, hard nitrogen compounds such as TiN are formed that may lead to lower cutting workability.

The constant velocity joint used in the power transmission shaft falls roughly into two classes of fixed type that allows displacement only in the angle between the two shafts, and sliding type that allows both angular displacement and axial displacement, which are selected according to the operating conditions, purpose and other factors. The fixed type includes the Rzeppa type constant velocity joint and the sliding type includes the double offset type onstant velocity joint and tripod type constant velocity joint as the representative ones.

Applications of the constant velocity joint include the power transmission system of the automobile. Recently, as the automobiles tend to have increasing output power and the vehicle weight increases for higher safety requirements, constant velocity joints of the drive shaft are required to have higher strength. On the other hand, the drive shaft is required to be lighter in weight in order to improve the fuel efficiency, that also imposes a pressing need to increase the strength of the constant velocity joint.

An outer member (outer race) that is a constituent element of the constant velocity joint is made of carbon steel or the like, that is forged into a predetermined form and subjected to heat treatment such as induction hardening in order to ensure the required levels of strength, durability and wear resistance, followed by grinding of portions that require high precision thereby finishing the part to the predetermined dimensions and completing the product. High strength requirement in this case may be satisfied by either increasing the carbon content thereby to increase the material strength or increasing the effective case depth. The former method, however, lowers the machinability for such processes as forging and cutting and leads to increased manufacturing cost. The latter method, on the other hand, is limited in the effect of increasing the strength since the anticipation of defects such as quenching crack makes it difficult to apply further deep hardening.

Constituent elements (inner member, cage, tripod member, etc.) of the constant velocity joint are made of carbon steel or the like, that is machined to a predetermined form and subjected to carburizing treatment in order to ensure the required levels of strength, durability and wear resistance, followed by grinding of portions that require high precision thereby finishing the part to the predetermined dimensions and completing the product.

When a part is carburized by heat treatment, however, the part undergoes a significant deformation caused by the heat treatment with variations in the dimensions. Thus it has been necessary to finish the parts by grinding after the heat treatment. Also pocket surfaces on both sides of the axis among pockets of the cage, for example, must have a certain surface accuracy in order to regulate the positions of torque transmitting balls, but the grinding process after the heat treatment is sometimes omitted in order to simplify the machining process. When the grinding process is omitted, parts that have large deformations caused by the heat treatment are rejected, resulting in higher reject ratio.

Accordingly, an object of the present invention is to provide a power transmission shaft that has high workability for such processes as forging and cutting, and high strength.

Another object of the present invention is to increase the strength of an outer race of a constant velocity joint while simplifying the machining processes for lower manufacturing cost and increase the accuracy.

Further another object of the present invention is to simplify the machining processes for the components of the joint such as the inner member, the cage and the tripod member and cut down on the manufacturing cost of the constant velocity joint.

SUMMARY OF THE INVENTION

The power transmission shaft will first be described below.

According to the present invention, in order to achieve the object described above, in the power transmission shaft using the constant velocity joint, graphite steel is subjected to induction hardening thereby to increase the surface hardness, and a 2-phase structure of ferrite and martensite is formed in the core. Graphite steel is made by graphitization annealing to turn the cementite included in the carbon steel into graphite, and such properties as high cutting machinability due to the inclusion of graphite that is a free cutting element and favorable property for cold forging and warm forging due to softness. Consequently, graphite steel maintains high machinability even when treated to include a high concentration of carbon for the purpose of increasing the strength.

While majority of the conventional power transmission shafts have been manufactured by applying induction hardening treatment to carbon steel, the core is not subjected to the influence of heat in many cases in order to avoid defects such as quenching crack. Even in such cases as the core is subjected to the influence of heat, most of the core has turned into martensite and therefore the residual compressive stress on the surface has diminished. According to the present invention, on the contrary, effect of the heat by induction hardening not only hardens the surface layer but also reaches the core to form solid solution of graphite with ferrite, thereby turning the core into 2-phase structure of ferrite and martensite. As a consequence, residual compressive stress remains on the surface thus making it possible to achieve higher strength and high resistance against fatigue. In order to give the effect of heat treatment to the core, it is preferable to carry out induction hardening a plurality of times (for example, twice).

As the graphite steel described above, such a material is used that contains 0.35 to 0.70% of C, 0.4 to 2.0% of Si, 0.3 to 1.5% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

Among the elements described above, C is an indispensable element for forming graphite. When the concentration of C is lower than 0.35%, surface hardness after induction hardening becomes too low resulting in insufficient strength. When the concentration of C is higher than 0.70%, cementite precipitates in the core thus making the core harder (brittle) and resulting in lower strength.

Si is added as a deoxidizing agent and graphitization accelerating agent during the steel making process and, in addition, for the purpose of enhancement of grain boundary. When the concentration of Si is lower than 0.4%, it becomes difficult to graphitize the carbide and the effect of grain boundary enhancement decreases. When the concentration of Si is higher than 2.0%, cold workability (ease of forging and cutting by turning) lowers significantly.

Mn content is required to fix sulphur included in the steel in the form of MnS and diffuse it. When the concentration of Mn is lower than 0.3%, hardenability becomes lower (sufficient depth of hardening cannot be obtained). When the concentration of Mn is higher than 1.5%, graphitization is significantly impeded and cold workability lowers.

S, existing in the form of MnS inclusion by bonding with Mn, may be the start point of cracking during cold working, and the concentration thereof is kept 0.025% or less. Concentration of P that precipitates in the grain boundaries of steel thereby to make the grain boundaries brittle, decrease the strength and increase sensitivity to quenching crack, is kept 0.02% or less.

Al, used as a deoxidization agent to remove oxygen included in the steel by being oxidized during steel making process, is contained with a concentration not less than 0.01%. Since a high concentration of oxide lowers the toughness and the oxide may become the start point of crack during cold working, the concentration of Al is kept 0.10% or less.

B and N are added in order to reduce the graphitization annealing time through the generation of BN. While addition of B with a concentration not less than 0.001% is required to achieve sufficient effect of time reduction, the effect of reducing the graphitization annealing time reaches a plateau at a concentration higher than 0.004%. N is added in a concentration in a range from 0.002% to 0.008% inclusive, in order to turn from 0.001% to 0.004% of the B content into BN.

The graphite steel described above includes 0.3 to 1.0 weight percent inclusive of Ni and/or 0.2 weight percent or less Mo added thereto. Addition of Ni increases the ductility of ferrite thereby improving the cold workability and strength. Ni content below 0.3% is insufficient for improving the cold workability and strength, and that higher than 1.0% lowers the turning machinability significantly. Addition of Mo improves the toughness, but content thereof higher than 0.2% impedes graphitization.

Strength can be balanced and prevented from decreasing, when the difference between maximum and minimum values of the surface hardness (Vickers hardness) is 200 Hv or less. Variations in strength of this range can be achieved by using graphite steel wherein the graphite grains are not greater than 15 μm in diameter. When the graphite grain size is greater than 15 μm, voids (pores) generated by the solution of graphite after hardening become larger, leading to soft spots and significant variations in the surface hardness, thus resulting in decreased strength.

The power transmission shaft described above is made to have a core portion that has hardness (Rockwell hardness) in a range from 25 to 45 HRC inclusive. When the hardness is lower than 25, sufficient strength cannot be obtained due to low proportion of martensite. When the hardness is higher than 45, proportion of full martensite increases thus making quenching crack more likely to occur in notches of the shaft such as serrated portions.

Fatigue strength can be improved by maintaining the residual compressive stress in the surface at 60 kgf/mm$^2$ or higher. When induction hardening is applied to graphite steel, hardenability is poor because solid solubility of the graphite portions is low during γ transformation. Consequently, quenching crack is less likely to occur even when subjected to water quenching similarly to high-carbon steel. With water quenching, high surface residual compressive stress of about 60 kgf/mm$^2$ can be achieved.

Fatigue strength can be improved further by applying shot peening after applying induction hardening, thereby to increase the residual compressive stress in the surface to 90 kgf/mm$^2$ or higher. In order to achieve this, it is preferable to apply shot peening twice.

The present invention described above makes it possible to provide a high-strength power transmission shaft that is excellent in machinability for such processes as cutting, cold forging and warm forging, and has high static strength and high fatigue strength.

The present invention also provides a constant velocity joint comprising an outer member that has a plurality of guide grooves formed on the inner circumference thereof, an inner member that has a plurality of guide grooves formed on the outer circumference thereof, torque transmitting balls arranged in a plurality of balls tracks formed from the guide grooves of the outer member and the guide grooves of the inner member, and a cage that holds the torque transmitting balls; or a constant velocity joint comprising an outer member that has three track grooves formed on the inner circumference thereof and roller guide surfaces disposed in the axial direction on either side of each track groove, a tripod member that has three arms extending radially and rollers rotatably mounted via a plurality of rolling elements on the three arms of the tripod member, the rollers being guided in the axial direction of the outer member by means of the roller guide surfaces on both sides of the track groove, wherein the outer member is subjected to such treatment as the surface layer is hardened by induction hardening of graphite steel and 2-phase structure of ferrite and martensite is formed in the core.

"Graphite steel" is a carbon steel of which cementite contents are turned into graphite by graphitization annealing, and has 2-phase structure of ferrite and graphite. The graphite steel has favorable properties such as high cutting machinability due to the inclusion of graphite that is a free cutting element and advantageous properties for cold forging and warm forging due to softness. Consequently, graphite steel maintains high machinability for such processes as cutting and forging even when treated to include a high concentration of carbon to increase the strength.

While many of the outer members of the prior art have been manufactured by applying induction hardening to carbon steel, the core is not subjected to the influence of heat in many cases in order to avoid defects such as quenching crack. Even in such cases as the core is subjected to the influence of heat, the core has mostly turned into martensite and therefore the residual compressive stress on the surface has diminished. According to the present invention, on the contrary, the effect of heat by the induction hardening not only hardens the surface layer but also reaches the core thereby to form a 2-phase structure of ferrite and martensite in the core. As a consequence, residual compressive stress remains on the surface thus making it possible to achieve higher strength and high resistance against fatigue. In order to give the effect of heat treatment to the core, it is preferable to carry out induction hardening a plurality of times, for example, twice.

As the graphite steel described above, such a material is used that contains 0.5 to 0.70% of C, 0.4 to 2.0% of Si, 0.4 to 1.5% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

Among the elements described above, C is an indispensable element for forming graphite. When the concentration of C is lower than 0.50%, surface hardness of the rolling surface after heat treatment becomes too low, and therefore sufficient strength and wear resistance cannot be achieved. When the concentration of C is higher than 0.70%, excessive hardness and precipitation of cementite in the core after the heat treatment result in lower strength.

Si is added as a deoxidizing agent and graphitization accelerating agent during steel making process and, in addition, for the purpose of enhancement of grain boundary. When the concentration of Si is lower than 0.4%, it becomes difficult to graphitize the carbide and the effect of grain boundary enhancement decreases. When the concentration of Si is higher than 2.0%, cold workability (ease of forging and cutting by turning) lowers significantly.

Mn content is required to fix sulphur included in the steel in the form of MnS and diffuse it. When the concentration of Mn is lower than 0.4%, hardenability becomes lower (sufficient depth of hardening cannot be obtained). When the concentration of Mn is higher than 1.5%, graphitization is significantly impeded and cold workability lowers.

S, existing in the form of MnS inclusion by bonding with Mn, may become the start point of cracking during cold working, and therefore the concentration thereof is kept 0.025% or less. Concentration of P, that precipitates in the grain boundaries of steel thereby to significantly lower the hot workability and significantly decrease the material strength, is kept 0.02% or less.

Al, used as a deoxidization agent to remove oxygen included in the steel by being oxidized during steel making process and reduce the particle size, is contained with a concentration not less than 0.01%. Since a high concentration of oxide lowers the toughness and the oxide may become the start point of crack during cold working, the concentration of Al is kept 0.10% or less.

B and N are added to reduce the graphitization annealing time through the generation of BN. While addition of B with a concentration of 0.001% or higher is required to achieve sufficient effect of time reduction, the effect of reducing the graphitization annealing time reaches a plateau at a concentration higher than 0.004%. N is added in a concentration in a range from 0.002% to 0.008% inclusive, in order to turn from 0.001% to 0.004% of B content into BN.

The graphite steel described above includes 0.3 to 1.0 weight percent inclusive of Ni and/or 0.2 weight percent of Mo added thereto. Addition of Ni increases the ductility of ferrite thereby improving the cold workability and strength. Ni content below 0.3% is insufficient for improving the cold workability and strength, while Ni content higher than 1.0% lowers the turning machinability significantly. Addition of Mo improves the toughness, but content thereof higher than 0.2% impedes graphitization.

For the graphite steel, that of graphite grain size within 15 $\mu$m is used. When the graphite grain size is greater than 15 $\mu$m, voids generated by the solution of graphite after quenching become larger, and soft spots cause the surface hardness to vary significantly, thus lowering the strength, wear property and life related to flaking.

The outer member is formed in a predetermined shape by forging. Forging temperature is set to not higher than the A1 transformation temperature (approximately 730° C.), in order to prevent carbide represented by cementite from precipitating in the graphite steel structure. This is because, when the temperature is higher than the $A_1$ transformation temperature, precipitation of cementite increases significantly thereby to impede the effect of forging and significantly lowers the machinability (cutting performance) in the subsequent processes. When this temperature condition is satisfied, 2-phase state of ferrite and graphite is maintained even after completing the product, as the precipitation of carbide is regulated at least in the forged skin that remains in the outer member. "Forged skin" used herein refers to a portion of the product where surface of the structure caused by forging remains, namely product surface left as induction-hardened without being ground, such as the bottom of the mouth of the outer member.

Balanced strength can be maintained and the strength can be prevented from decreasing when the difference between maximum and minimum values of the surface hardness (Vickers hardness) is 200 Hv or less. Variations in strength of this range can be achieved by using graphite steel wherein the graphite grains are not greater than 15 $\mu$m in diameter.

The outer member is made to have a core (core of serrated portion) of Rockwell hardness in a range from 25 to 45 HRC inclusive. When the core has hardness lower than 25 HRC, insufficient effect of strength improvement is obtained due to low content of martens ite. When the hardness is higher than 45 HRC, full martensite content increases that makes quenching crack likely to occur in notched portion (serrated portion, for instance) of the shaft. Hardness of the core can be controlled by regulating the processing temperature and duration of induction hardening and carbon content in the graphite steel. It suffices to achieve the required level of hardness described above at least in the core of the serrated portion. Other portions such as the core of mouth are normally made to have higher hardness than the core of the serrated portion.

Improvement in fatigue strength can be achieved when the residual compressive stress in the surface is 50 kgf/mm$^2$ or higher. When induction hardening is applied to graphite steel in general, hardenability is poor because solid solubility of the graphite portions is low during γ transformation. Consequently, quenching crack is less likely to occur even when subjected to water quenching, similarly to high-carbon steel. With water quenching, high residual compressive stress in the surface of about 50 kgf/mm² can be achieved. It suffices to achieve the required level of residual compressive stress described above at least in the surface of the serrated portion. Surfaces of other portions, for example surface of the mouth, shows higher value of residual compressive stress than the serrated portion.

Fatigue strength can be improved further by applying shot peening after induction hardening thereby to increase the residual compressive stress in the surface to 80 kgf/mm² or higher. In order to achieve this, it is preferable to carry out shot peening twice. Shot peening is applied at least to the serrated portion and the outer circumference of the mouth.

Wear resistance can be improved by using a low friction grease, specifically a grease having friction coefficient μ of 0.07 or lower, for filling the inside of the constant velocity joint. The friction coefficient μ can be measured with SAVIN friction wear tester.

The present invention described above makes it possible to provide the outer member that is excellent in machinability for such processes as cutting, cold forging and warm forging, and has high strength such as static strength and fatigue strength. As a consequence, cost reduction and improvement in strength can be achieved for the constant velocity joint.

Also in the present invention, a constant velocity joint is fabricated comprising an outer member that has a plurality of guide grooves formed on the inner circumference thereof, an inner member that has a plurality of guide grooves formed on the outer circumference thereof, torque transmitting balls arranged in a plurality of ball tracks formed from the guide grooves of the outer member and the guide grooves of the inner member, and a cage that holds the torque transmitting balls, wherein either one or both of the cage and the inner member is formed from graphite steel subjected to austempering treatment.

Also in the present invention, a constant velocity joint (tripod type constant velocity joint) is fabricated comprising an outer member that has three track grooves formed on the inner circumference thereof and roller guide surfaces disposed in the axial direction on either side of each track groove, a tripod member that has three arms extending and protruding radially and rollers rotatably mounted via a plurality of rolling elements on the three arms of the tripod member, wherein the rollers are guided in the axial direction of the outer member by means of the roller guide surfaces on both side of the track groove, wherein the tripod member is formed from graphite steel subjected to austempering treatment.

Further in the present invention, a constant velocity joint is fabricated comprising an outer member that has guide grooves of curved shape formed on spherical inner circumference thereof, an inner member that has guide grooves of curved shape formed on spherical outer circumference thereof, torque transmitting balls arranged in a ball track formed from the guide grooves of the outer member and the guide grooves of the inner member, and a cage that holds the torque transmitting balls, wherein center of the guide grooves of the outer member and center of the guide grooves of the inner member are offset to the opposite sides in the axial direction by the same distance with regards to the center plane of the joint that includes the centers of the torque transmission balls, the ball track being gradually reduced toward the opening or inner end of the joint, and the torque transmitting balls being elastically pressed toward the reduced side of the ball track, wherein the outer member being formed from graphite steel subjected to austempering treatment.

"Graphite steel" is a carbon steel of which cementite contents are turned into graphite by graphitization annealing, to form 2-phase structure of ferrite and graphite, and has favorable properties such as high cutting machinability due to the inclusion of graphite that is a free cutting element and advantageous property for cold forging and warm forging due to softness consequently, graphite steel maintains high machinability even when treated to include a high concentration of carbon in order to increase the strength.

Austempering is one type of hardening process that utilizes the S curve in the phase diagram of steel. It is a heat treatment process wherein steel heated into the austenite region is immersed in a hot bath (a bath of salt or lead-bismuth) that is maintained at the banite forming temperature, namely in a range of temperatures between Ar' and Ar" transformation points below the knee of the S curve (the lowest temperature at which the transformation takes place), and held therein until the steel structure turns completely to banite, before being taken out therefrom and cooled down to the room temperature. When the steel is held at a high bath temperature, upper bainite having feather-like structure is formed and, at temperatures near Ms point, lower bainite having rod-like structure is formed. Bainite structure is basically a mixture of ferrite and iron carbide, which has a mechanical property that is said to be tougher than a structure of the same hardness achieved by hardening and annealing.

When austempering treatment is applied to carbon steel in order to increase the hardness to 50 HRC (Rockwell hardness) or higher, it requires high carbon content that significantly lowers the workability of the material for forging and other processes. When austempering treatment is applied to graphite steel as in the case of the present invention, workability for forging can be improved due to the ductility (lower resistance against deformation) of the graphite steel. Also because austempering treatment causes far less thermal deformation than other hardening processes, grinding process after the heat treatment can be omitted. Furthermore, since annealing is not required, the cost of heat treatment can be made lower than the conventional heat treatment (hardening plus annealing). Consequently, processes for manufacturing the components of the constant velocity joint, namely the cage, the inner member and the tripod member can be simplified, and cost reduction for the constant velocity joint can be achieved. Since the graphite steel subjected to austempering treatment transforms into bainite structure, a tough material of high durability can be obtained.

As the graphite steel described above, such a material is used that contains 0.45 to 0.75% of C, 0.4 to 2.0% of Si, 0.2 to 1.0% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

Among the elements described above, C is an indispensable element for forming graphite. When the concentration of C is lower than 0.45%, surface hardness achieved by heat treatment becomes too low to obtain a sufficient strength. When the C content is higher than 0.75%, toughness achieved by the heat treatment decreases.

Si is added as a deoxidizing agent and graphitization accelerating agent during the steel making process and, in addition, for the purpose of enhancement of grain boundary. When the concentration of Si is lower than 0.4%, it becomes difficult to graphitize the carbide and the effect of grain boundary enhancement decreases. When the concentration of Si is higher than 2.0%, cold workability (capability to be forged and cut by turning) lowers significantly.

Mn content is required to fix sulphur, included in the steel, in the form of MnS and diffuse it. When the concentration of Mn is lower than 0.2%, hardenability becomes lower (sufficient depth of hardening cannot be obtained). When the concentration of Mn is higher than 1.0%, graphitization is significantly impeded and cold workability deteriorates.

S, existing in the form of MnS inclusion through bonding with Mn, may become the start point of cracking during cold working, and therefore the concentration thereof is kept 0.025% or less. Concentration of P, that precipitates in the grain boundaries of steel and significantly lowers the hot workability, is kept 0.02% or less.

Al, used as a deoxidization agent to remove oxygen included in the steel by being oxidized during the steel making process and reduce the particle size, is contained with a concentration not less than 0.01%. Since a high concentration of oxide lowers the toughness and the oxide may become the start point of crack during cold working, the concentration is kept 0.10% or less.

B and N are added to reduce the graphitizing annealing time through the generation of BN. While addition of B in a concentration of 0.001% or higher is required to achieve sufficient effect of time reduction, the effect of reducing the graphitizing annealing time reaches a plateau at a concentration higher than 0.004%. N is added in a concentration in a range from 0.002% to 0.008% inclusive, in order to turn the B content of 0.001% to 0.004% into BN.

The graphite steel described above includes 0.3 to 1.0 weight percent inclusive of Ni and/or 0.2 weight percent of Mo added thereto. Addition of Ni increases the ductility of ferrite thereby improving the cold workability and strength. Ni content below 0.3% is insufficient for improving the cold workability and strength, while Ni content higher than 1.0% lowers the turning machinability significantly. Addition of Mo improves the toughness, but content thereof higher than 0.2% impedes grahitization.

Graphite steel containing graphite grains of diameters within 15 $\mu$m is used. Graphite grains of diameter greater than 15 $\mu$m become the start points of cracking and lower the forging performance.

The components of the joint described above are made to have hardness from 50 to 60 HRC inclusive, particularly in the core. When hardness of the core is lower than 50 HRC, sufficient effect of improving the strength cannot be obtained. When the hardness is higher than 60 HRC, toughness decreases. Hardness of the core can be changed by adjusting the austempering temperature and the carbon content in the graphite steel.

When less carbon content is included in the graphite steel, austempering temperature must be lowered while this may cause variations in the surface hardness after heat treatment. In this case, a carburized layer is formed on the surface to increase the carbon content in the graphite steel, before applying austempering treatment.

Surface hardness can be increased to, for example, about 900 Hv and improve the wear resistance, by forming a nitrided layer through diffusion of nitrogen in the surface layer that has been subjected to austempering treatment.

Forming sulfide (such as FeS film) in the surface layer after austempering treatment improves the surface lubrication and the stability of the constant velocity joint operation. The sulfide may be formed either directly on the surface after austempering treatment or after forming the nitrided layer on the surface.

Hardness of austempered surface is generally lower than that of a carburized part. Thus, wear resistance can be improved by using a low friction grease, specifically a grease having a friction coefficient $\mu$ of 0.07 or lower, for filling the inside of the constant velocity joint. The friction coefficient $\mu$ can be measured with SAVIN type friction wear tester.

According to the present invention, as described above, since austempering teatment is employed instead of carburizing treatment in the prior art as the heat treatment process for the cage, the inner member and the tripod member, less deformation due to the heat treatment results. This makes it possible to simplify or omit the machining processes such as grinding employed for ensuring the accuracy after heat treatment, while the reject ratio also becoming lower than that of the prior art. Also the double processes of hardening and annealing can be integrated into one process, so that the heat treatment cost is reduced. In order to achieve a hardness of HRC50 or higher while applying austempering treatment to carbon steel, high carbon content is necessary which in turn significantly lowers the workability for forging and machining. However, the use of graphite steel ensures high workability for forging and machining. As a result, manufacturing cost for the constant velocity joint can be cut down through the simplification of the processes.

These and other objects and advantages of the present invention will become clear from the following description with reference to the accompanying drawings.

DETAILED DESCRIPTION OF THE PREFERRED EMBODIMENTS

Figure 1:
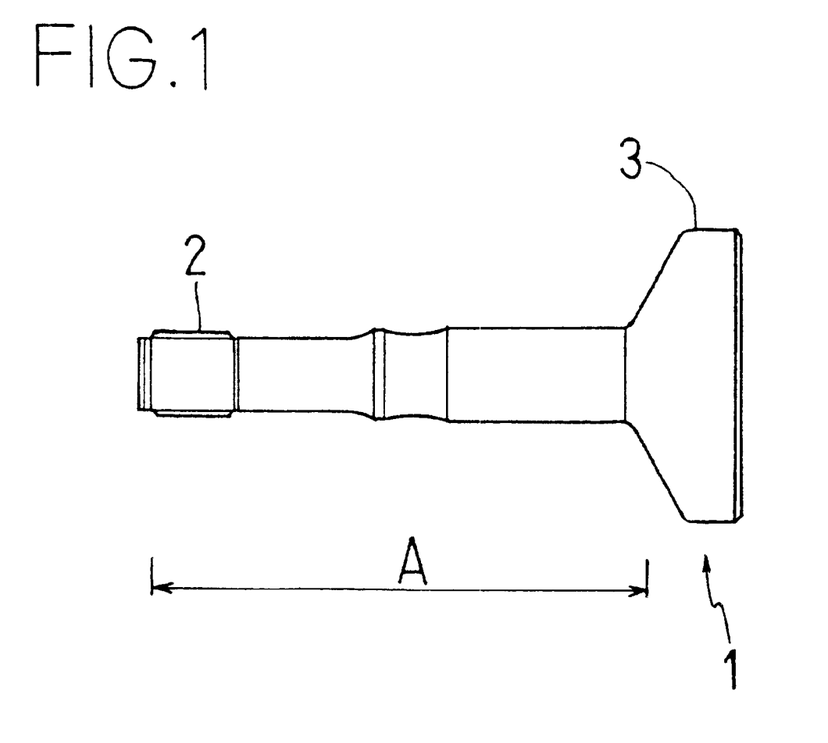
FIG. 1 is a side view showing a stub of a constant velocity joint as an example of power transmission shaft.

FIG. 1 shows, as an example of power transmission shaft, a pressure-welded stub 1 for a constant velocity joint used as a propeller shaft or a drive shaft of an automobile. The stub 1 is made of graphite steel, and has a toothed portion 2

(serration or the like) provided on one end thereof for the purpose of torque transmission. An inner member (inner race) of the constant velocity joint is secured on the toothed portion 2. The stub 1 has a flange 3 provided on the other end for the purpose of pressure welding of a steel pipe thereto.

Graphite steel containing graphite grains of diameters within 15 μm is used. This type of graphite steel can be manufactured, for example, by a method disclosed in Japanese Patent Application Laid-open No.Hei 8-283847. That is, a hot-rolled material is cooled with water at cooling start temperature of $A_{r1}$ or higher and cooling end temperature of Ms or lower with mean cooling rate in a range from 30 to 100° C./s. Then after being cooled in air, the material is graphitized at a temperature from 600 to 720° C. and subjected to wire drawing, drawing or extrusion process with a reduction ratio of 30% or higher, thereby to make a steel rod.

In the process described above, the cooling start temperature measured on the surface of the steel rod must be $A_{r1}$ or higher in order to have martensite transformation strain and rolling strain to take place simultaneously and have graphite to form at larger number of sites. The cooling end temperature must be within Ms in order to obtain martensite transformation structure and make graphitization occur easily. Lower limit of the mean cooling rate is set to 30° C./s for the purpose of obtaining martensite transformation structure and make graphitization easy by causing work strain to remain. Upper limit of the mean cooling rate is set to 100° C./s because a cooling rate higher than this does not increase martensite transformation. Annealing temperature is set in a range from 600 to 720° C. because graphitization takes least time in this temperature range. Wire drawing process is carried out after graphitization for the purpose of, in addition to securing roundness of the steel rod and a predetermined strength, decomposing graphite and decreasing the void size generated during the hardening and annealing processes carried out after cold forging, thereby improving the toughness. Particularly in cold forging, untransferred portion called dead metal is generated. In the untransformed portion, graphite is not decomposed and void size generated during the hardening and annealing processes carried out after cold forging is large, thus resulting in low toughness. Consequently, it is necessary to decompose graphite by the wire drawing process before cold forging. At this time, when the reduction ratio is less than 30%, since graphite cannot be fully decomposed, void size generated during the hardening and annealing processes carried out after cold forging is large and therefore toughness cannot be improved.

The rod of graphite steel thus obtained is formed into the shape of stub described above through cold forging and other processes and subjected to induction hardening. Induction hardening is applied to the region A that includes from the serrated portion 2 to the flange 3. The induction hardening increases the surface hardness in the region A of the stub 1 to 50 HRC or higher. The effect of heat generated by this induction hardening is caused to reach the core, thereby generating a 2-phase structure of ferrite and martensite in the core. While hardening is preferably applied twice to have the core heat-treated, the 2-phase structure can also be formed in the core with a single hardening process by, for example, heating with power supply of a lower frequency, heating over a longer period of time in the case of high frequency or taking a longer time (lag time) after the end of heating before cooling.

After completing the induction hardening, the part is subjected to annealing and, as required, a finish work such as grinding, thereby completing the stub 1.

The present invention is not limited to the stub 1, and can be applied widely to power transmission shafts that employ constant velocity joints such as a welded stub or a shaft (whether hollow or solid) connected to a constant velocity joint.

In order to verify the effects of the present invention, the following test was conducted.

A torque transmission shaft 170 mm long and blank diameter of 30 mm made of graphite steel (C: 0.53%, Si: 1.2%, Mn: 0.4%, P: 0.010%, S: 0.015%, Al: 0.03%, B: 0.0018%, N: 0.0055%) that corresponds to the JIS code of S53C was provided with splines of D.P.=32/64 and number of teeth N=30 on both ends for the purpose of fitting, machined to have a stepped notch 20 mm in diameter of stress concentration factor of α=1.33 at the middle of the shaft, and was then subjected to induction hardening. For comparison, a shaft of the same configuration made of carbon steel S53C (C: 0.53%, Si: 0.25%, Mn: 0.75%, P: 0.015%, S: 0.017%, Al: 0.025%, Cr: 0.10%) was hardened by a method similar to that described above. Both samples were subjected to heat treatment to achieve surface hardness of 58 to 62 HRC and effective case depth of 2.5 mm. Hardness of the shaft core was set to about 25 HRC in the case of graphite steel and 18 HRC in the case of carbon steel. The core was made in a metal structure that contains ferrite and martensite in the case of graphite steel having composition equivalent to S53C and a metal structure that contains ferrite and pearlite in the case of S53C carbon steel.

Torsional strength test was conducted on these samples. Both the graphite steel and the carbon steel showed comparable strengths in a static torsion test, though the graphite steel showed a strength more than 5% higher than the carbon steel in a repetitive dual-direction torsion test.

A comparative experiment was conducted on test pieces made of graphite steel that corresponds to the JIS code of S45C (C: 0.45%, Si: 1.41%, Mn: 0.31%, P: 0.015%, S: 0.010%, Al: 0.027%, B: 0.0014%, N: 0.005%) and carbon steel S45C (C: 0.45%, Si: 0.20%, Mn: 0.9%, P: 0.016%, S: 0.015%, Al: 0.025%, Cr: 0.10%), both made in the same configuration. While the test pieces were hardened by induction heating similarly to the test described previously, heat treatment was conducted to achieve surface hardness of 56 to 61 HRC and effective case depth of 4.0 mm. Hardness of the shaft core was set to about 28 HRC in the case of graphite steel and 12 HRC in the case of carbon steel. The core was made to have a metal structure that contains ferrite and martensite in the case of graphite steel having composition equivalent to S45C and a metal structure that contains ferrite and pearlite in the case of S45C carbon steel.

Torsional strength test was conducted on these samples. Both the graphite steel and the carbon steel showed comparable strengths in a static torsion test, though the graphite steel showed a strength more than 12% higher than the carbon steel in a repetitive dual-direction torsion test, particularly 15 to 20% higher strength in a region of low loads (high cycle fatigue).

A test piece made of graphite steel that corresponds to S45C in the same configuration was subjected to heat treatment twice to achieve surface hardness of 56 to 61 HRC and effective case depth of 4.0 mm. Hardness of the core was set to about 28 HRC and a metal structure that contains ferrite and martensite. Variation in the surface hardness was set to 200 Hv or lower in terms of Vickers hardness.

Torsional strength test was conducted on this sample. This sample showed a strength 10% higher than the graphite steel subjected to single heat treatment in a static torsion test. In a repetitive dual-direction torsion test, this sample showed a strength more than 12% higher than carbon steel similarly to the graphite steel subjected to single heat treatment, particularly a strength from 15 to 20% higher in a region of low loads (high cycle fatigue).

Measurement of surface compressive strength and repetitive dual-direction torsion fatigue (high cycle fatigue) test were conducted on the graphite steel that corresponds to S45C, a test piece made of this graphite steel that was hardened with a coolant made of water including 15% of water-soluble cooling agent and a test piece subjected to shot peening after induction hardening. Graphite steel that corresponds to S45C showed surface compressive stress of 50 kgf/mm$^2$, the water-hardened test piece 65 kgf/mm$^2$, and the shot-peened test piece 97 kgf /mm$^2$. Strength shown in the dual-direction torsion fatigue was 9% higher in the water-hardened test piece, and 20% higher in the shot-peened test piece, compared to the graphite steel that corresponds to S45C.

Figure 2:
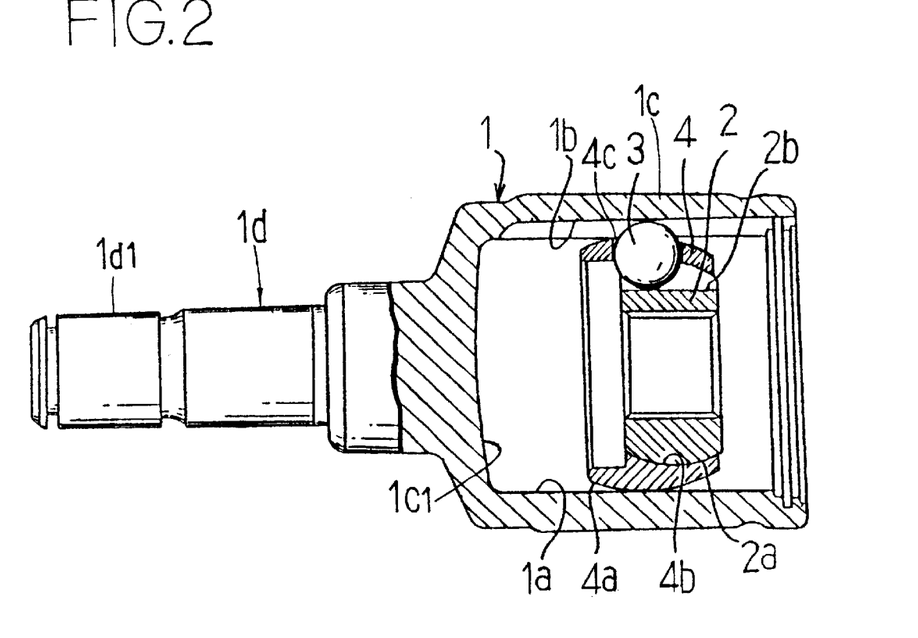
FIG. 2 is a sectional view showing a double offset type constant velocity joint in the axial direction thereof (section taken along line A—A in FIG. 3).
Figure 3:
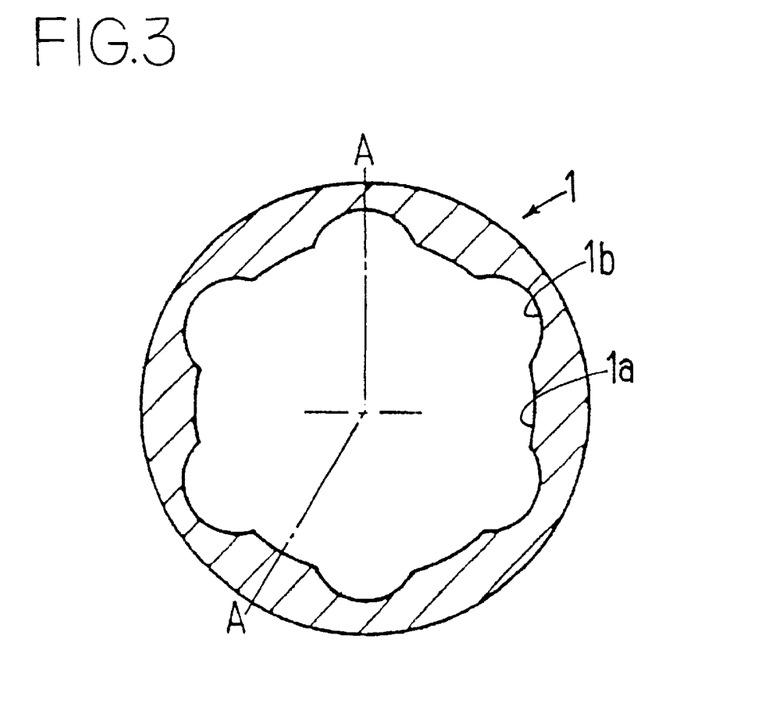
FIG. 3 is a sectional view of an outer member of the constant velocity joint in radial direction.

FIG. 2 and FIG. 3 show a double offset constant velocity joint. The constant velocity joint comprises an outer member 1 that has a plurality of (for example, six) straight guide grooves 1b formed in the axial direction on a cylindrical inner circumference 1a, an inner member 2 that has a plurality of (for example, six) straight guide grooves 2b formed in the axial direction on a spherical outer circumference 2a, a plurality of (for example, six) torque transmitting balls 3 arranged in balls tracks formed from the guide grooves 1b of the outer member 1 and the guide grooves 2b of the inner member 2, and a cage 4 that holds the torque transmitting balls 3. The cage 4 is a ring-shaped body comprising an outer circumference 4a of spherical shape that is guided by the inner circumference 1a of the outer member 1 while being in contact therewith, an inner circumference 4b of spherical shape that is guided by the outer circumference 2a of the inner member 2 while being in contact therewith, and a plurality of (for example, six) recesses 4c that house the torque transmitting balls 3. Center of sphere of the outer circumference 4a and center of sphere of the inner circumference 4b are offset to the opposite sides of the center of the recess 4c by the same distances in the axial direction.

When the joint transmits a rotational torque with an operation angle θ, the cage 4 turns to the position of the torque transmitting ball 3 that moves over the ball track in accordance to the inclination of the inner member 2, and holds the torque transmitting balls 3 in the bisecting plane (θ/2) of the operation angle θ. Thus the joint can maintain a constant speed of rotation. When the outer member 1 and the inner member 2 make a relative movement in the axial direction, slippage occurs between the outer circumference 4a of the cage 4 and the inner circumference 1a of the outer member 1, thereby enabling smooth movement in the axial direction (plunging).

The cage 4 is made of graphite steel, particularly one that contains graphite grains of diameters within 15 μm. Graphite steel of graphite grain size within 15 μm can be manufactured by the method disclosed, for example, in Japanese Patent Application Laid-open No. Hei 8-283847, similarly to the case described previously.

The rod made of graphite steel is formed into the shape of the outer member 1 shown in FIG. 2 and FIG. 3 by forging. Forging temperature is set to the Al transformation temperature (approximately 730° C.) or lower, in order to prevent cementite from precipitating in the graphite steel structure. This causes the 2-phase state of ferrite and graphite to be maintained in the forged skin (for example, bottom 1c1 of the mouth 1c) that remains in the outer member.

Induction hardening is applied to the graphite steel that has been forged into the predetermined shape. The effect of heat generated by this induction hardening is caused to reach, not only the core of the outer member 1, specifically the core of the cylindrical mouth 1c, but also the core of the shaft 1d, thereby generating a 2-phase structure of ferrite and martensite in these cores. While hardening is preferably applied twice to have the core heat-treated, the 2-phase structure can also be formed in the cores with a single hardening process by, for example, heating with power supply of a lower frequency, heating over a longer period of time in the case of high frequency, or taking a longer time (lag time) after the end of heating before cooling. With this hardening process, the core of the serrated portion 1d1 is hardened to about 25 to 45 HRC.

After completing the induction hardening, the part is subjected to annealing and, as required, finish work such as grinding is applied to the inner circumference 1a and the guide groove 1b in order to ensure the accuracy, thereby completing the outer member 1.

As described above, when the graphite steel is used as the material to make the outer member 1, workability in forging, whether cold or warm processing, can be improved due to the high ductility. Also because the material can be forged with a high accuracy, grinding removal allowance for the subsequent grinding process can be decreased, resulting in reduction in the cycle time and in the labor of disposing of chips. Moreover, grinding process for the inner circumference 1a or the guide groove 1b, or in some cases for both of these can be omitted, thus significantly reducing the manufacturing cost through simplification of the processes. Since graphite steel includes graphite that is a free cutting element and can be cut well, machining accuracy of turning can be improved and the cost of grinding can be reduced. Also the effect of heat by the induction hardening not only hardens the surface layer but also reaches the core to form the 2-phase structure of ferrite and martensite in the core. As a consequence, residual compressive stress remains on the surface thus achieving higher strength and high resistance against fatigue.

The present invention is not limited to the double offset type constant velocity joint described above, and can be applied widely to constant velocity joints such as the Rzeppa type constant velocity joint (ball-fixed joint) and the tripod type constant velocity joint. As an example, the structure of a constant velocity joint will be briefly described below.

Figure 4A:
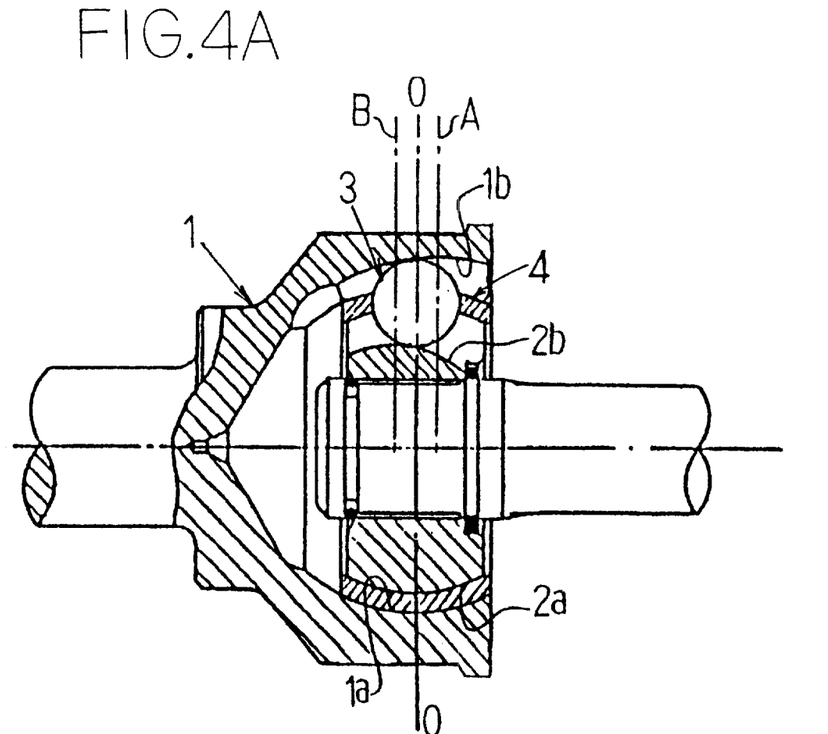
FIG. 4A is a sectional view showing a Rzeppa type constant velocity joint (section taken along line A—A in FIG. 4B).
Figure 4B:
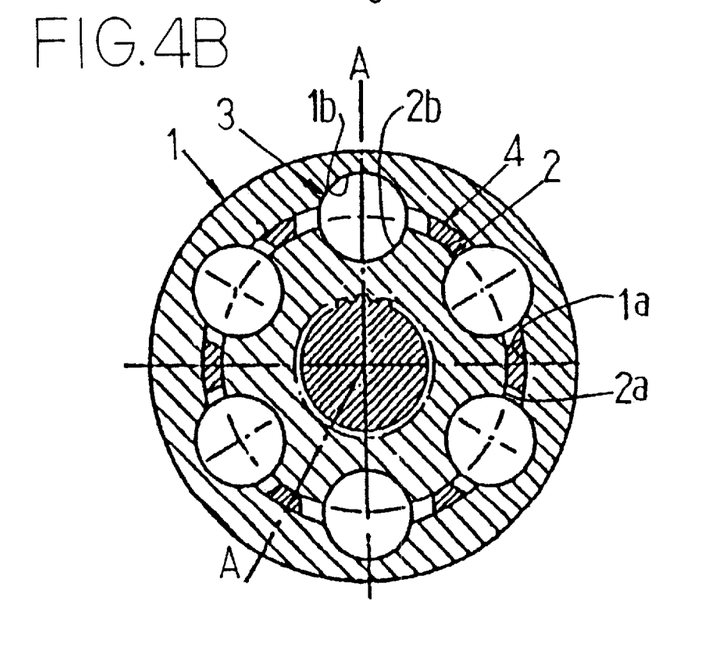
FIG. 4B is a sectional view in the radial direction.

FIG. 4A and FIG. 4B show the Rzeppa type constant velocity joint. This constant velocity joint comprises an outer member 1 that has a plurality of (normally six) curved guide grooves 1b formed in the axial direction on a spherical inner circumference 1a, an inner member 2 that has a plurality of (normally six) curved guide grooves 2b formed in the axial direction on a spherical outer circumference 2a, a plurality of (normally six) torque transmitting balls 3 arranged in ball tracks formed by the guide grooves 1b of the outer member 1 and the guide grooves 2b of the inner member 2, and a cage 4 that holds the torque transmitting balls 3.

Center A of the guide grooves 1b of the outer member 1 and center B of the guide grooves 2b of the inner member 2 are offset to the opposite sides of the center plane of the joint that includes the centers of the torque transmitting balls 3 by the same distances in the axial direction. Consequently, the ball track has a wedge shape that is wider on the side of opening and gradually reduces toward the inner side. The centers of both spheres of the inner circumference 1a of the outer member 1 and the outer circumference 2a of the inner member 2 that are the guide face of the cage 4 correspond with the center plane O of the joint. When the outer member 1 and the inner member 2 make an angular displacement of θ, the torque transmitting balls 3 guided by the cage 4 are always held in the bisecting plane (θ/2) of the, angle θ, at any operation angle θ, so that a constant speed of rotation of the joint can be maintained.

In this constant velocity joint, the outer member 1 can also be subjected to induction hardening of the graphite steel thereby to harden the surface and generate the 2-phase structure of ferrite and martensite in the core. Other aspects of the structure, manufacturing procedure, functions and the effects are similar to the embodiment shown in FIG. 2 and FIG. 3, and duplicating description will be omitted.

Figure 5:
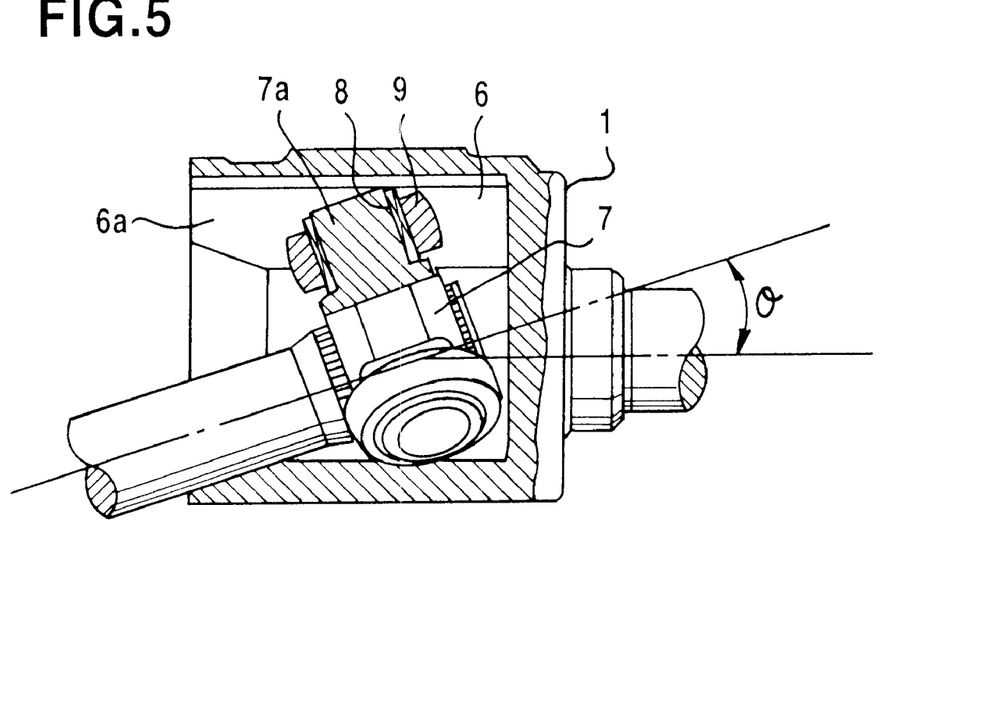
FIG. 5 is a sectional view showing a tripod type constant velocity joint in the axial direction thereof.
Figure 6:
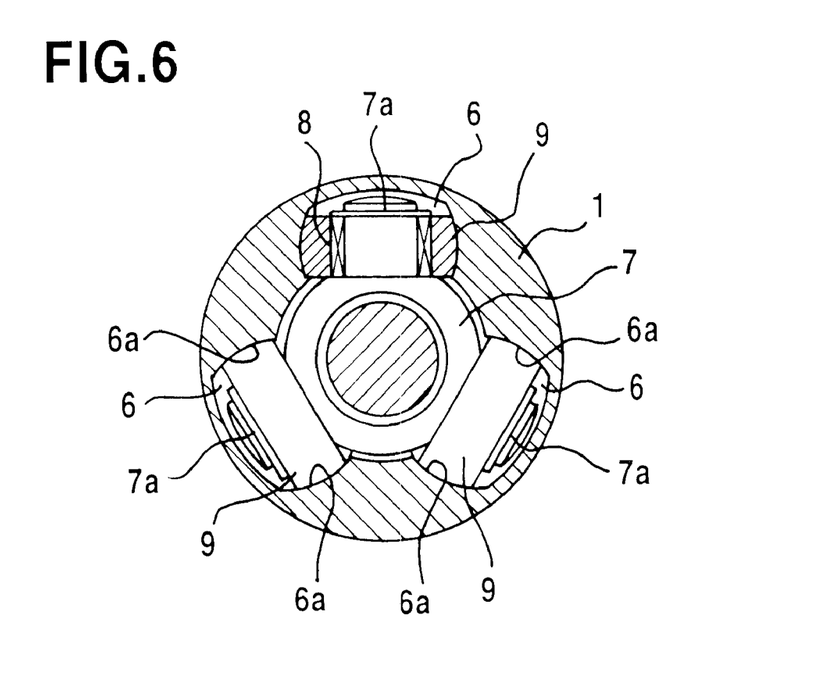
FIG. 6 is a sectional view of the constant velocity joint in the radial direction.

FIG. 5 and FIG. 6 show the tripod type constant velocity joint. This constant velocity joint comprises an outer member 1 that has three track grooves 6 formed on the inner circumference and roller guide surfaces 6a disposed in the axial direction on either side of each track groove 6, a tripod member 7 that has three arms 7a extending and protdruding radially and rollers 9 rotatably mounted via a plurality of rolling elements, for example needle rollers 8, on the three arms 7a of the tripod member 7, The rollers 9 are fitted onto the roller guide surfaces 6a located on both sides of the track groove 6, respectively. As the rollers 9 move rolling on the roller guide surfaces 6a while rotating around the axis of the arms 7a, relative axial displacement and angular displacement between the outer member 1 and the tripod member 7 are smoothly guided. At the same time, when the outer member 1 and the tripod member 7 transmit the rotational torque while taking the predetermined operation angle, axial displacement of each arm 7a with respect to the roller guiding surface 6a due to the change in the phase of rotation at this time can be smoothly guided.

In this constant velocity joint, the outer member 1 can also be subjected to induction hardening of the graphite steel thereby to harden the surface and generate the 2-phase structure of ferrite and martensite in the core. Other aspects of the structure, the manufacturing procedure, functions, and the effects are similar to those of the embodiment shown in FIG. 2 and FIG. 3, and duplicating description will be omitted.

Some of the tripod constant velocity joints have such a configuration as the rollers 9 are made up of two types of rollers, namely inner rollers and outer rollers, in order to reduce the thrust induced and such an inclination mechanism is provided that allows an inclination between the outer rollers and the arm 7a. The present invention can also be applied to this type of constant velocity joint.

In order to determine the type of grease suited to the constant velocity joint of the present invention, surface wear was measured with various types of greases with the SAVIN type friction wear tester.

Wear (durability) was evaluated in terms of the amount of wear of the guide groove 1b of the outer member 1 of the ball-fixed joint. The outer member was fabricated by applying cold forging to graphite steel (C: 0.59%, Si: 0.8%, Mn: 0.4%, P: 0.020%, S: 0.013%, B: 0.0015%, N: 0.0030%, Al: 0.015%), applying induction hardening thereto and then grinding the guide groove. The amount of wear of the guide groove was measured after running the above constant velocity joint at a rotational speed of 230 rpm under a load torque of 834N·m (85 kgf·m) with an operation angle θ=6° for 50 hours. Friction coefficient μ of the grease was measured after running the SAVIN type friction wear tester at a peripheral speed of 108 m/min under a load of 12.7N (1.3 kgf) for 10 minutes.

Figure 7:
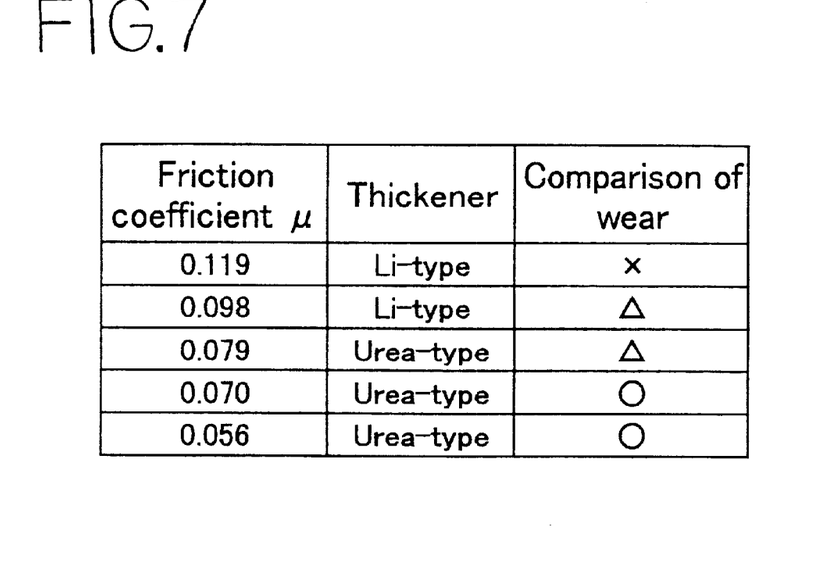
FIG. 7 shows the results of a test.

Results of the test are shown in FIG. 7. In the figure, ○ indicates a small amount of wear and Δ indicates a large amount of wear.

FIG. 7 shows that a grease containing a Urea-type thickener, particularly that of μ value not higher than 0.070 is effective in improving wear resistance.

Figure 8:
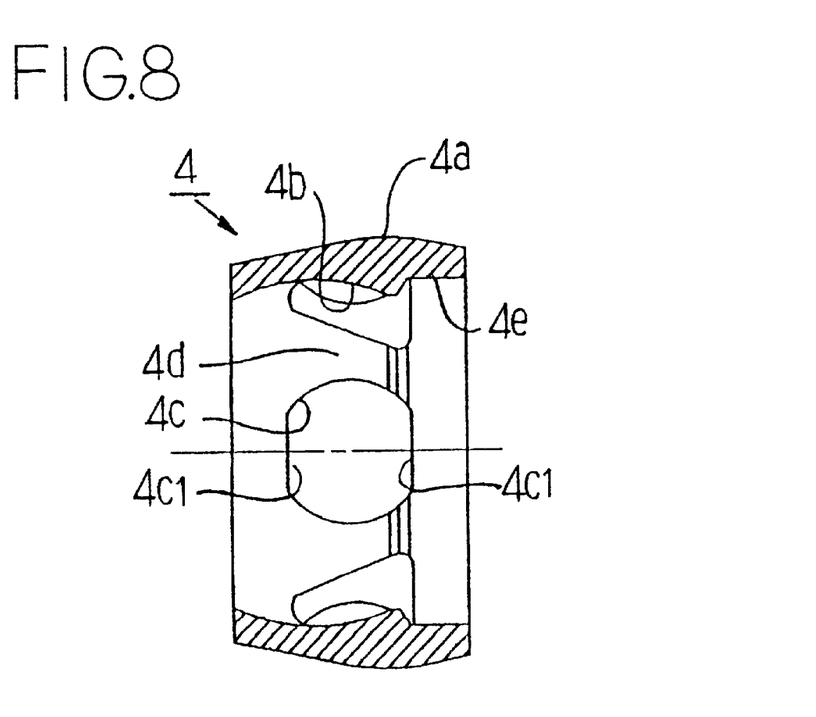
FIG. 8 is a sectional view of a cage of the double offset type constant velocity joint.

As shown in an enlarged figure in FIG. 8, the cage 4 of the double offset type constant velocity joint shown in FIG. 2 is a ring-shaped body comprising the outer circumference 4a of spherical shape that is guided by the inner circumference 1a of the outer member 1 while making contact therewith, the inner circumference 4b of spherical shape that is guided by the outer circumference 2a of the inner member 2 while making contact therewith, and a plurality of (for example, six) recesses 4c that house the torque transmitting balls 3. Provided on both sides of the recess 4c in the circumferential direction are pillar portions 4d, and an inlet 4e on one side in the axial direction for incorporating the inner member 2. Center of sphere of the outer circumference 4a and center of sphere of the inner circumference 4b are offset to the opposite sides of the center of the recess 4c by the same distances in the axial direction.

The cage 4 is made of graphite steel, particularly that of graphite grain size within 15 μm. Graphite steel of graphite grain size within 15 μm can be manufactured by the method disclosed, for example, in Japanese Patent Application Laid-open No. Hei 8-283847, similarly to that described previously.

This steel rod made of graphite steel is finished by, after forming the shape of the cage shown in FIG. 8 by cold forging or the like, applying austempering treatment as heat treatment and, as required, a machining operation of the outer circumference 4a and the inner circumference 4b such as grinding, for ensuring accuracy. Conditions of austempering treatment may be such as heating at 880° C. for 1.5 hours in a furnace, then keeping at a temperature of 305° C. for two hours in a salt bath furnace. When treated under these conditions, lower bainite structure is obtained.

When the graphite steel is used as the material to make the cage 4, workability in forging, whether cold or warm processing, can be improved due to the high ductility. Also because the austempering treatment employed instead of the conventional carburization results in less thermal deformation caused by heat treatment, grinding or other machining operation carried out to achieve the required accuracy after the heat treatment can be simplified or omitted. For example, grinding of the recess surfaces 4c1 located on both sides of the recess 4c in the axial direction after the heat treatment can be omitted, while less thermal deformation is caused due to the heat treatment thus leading to a reject ratio lower than in the conventional process. Grinding of the outer circumference 4a and the inner circumference 4b after heat treatment may be limited to the regions where these components make contact with the outer member 1 and the inner member 2 or, in some cases, omitted altogether. Moreover, since the graphite steel structure is transformed into bainite by the austempering treatment, highly tough material having better durability can be obtained. Hardness of the core after austempering treatment is preferably in a range from 50 HRC to 60 HRC which ensures satisfactory wear resistance and toughness.

It is preferable to form a nitrided layer or an FeS film (sulfide) on the surface. Formation of the nitrided layer contributes to the improvement of wear resistance and that of FeS film improves lubrication. An FeS film may also be formed over a nitrided layer. Although formation of the nitrided layer makes the surface less conformable to a mating part due to the increased surface hardness thus impeding the lubrication, forming a sulfide layer such as an FeS film over the nitrided layer restores good lubrication.

When less carbon content (near 0.45%) is included in the graphite steel, austempering treatment temperature must be lowered while this may cause variations in the surface hardness after heat treatment. In this case, a carburization treatment (micro-carburizing) may be applied to the graphite steel to form a micto-carburized layer on the surface layer before applying the austempering treatment. Carburization increases the carbon content in the surface layer so that the hot bath temperature during the austempering treatment can be raised, thereby making it possible to achieve uniform surface hardness.

While the cage 4 is taken as an example in the foregoing description, the inner member 2 can also be manufactured in a similar procedure. That is, after the inner member 2 made of graphite steel has been forged into a shape, austempering treatment is applied to form bainite structure. In this case, treatment (carburizing, etc.) applied prior to austempering treatment and post-austempering processes (such as grinding and formation of nitrided layer or sulfide) may be done similarly to the case of the cage 4.

In the Rzeppa type constant velocity joint shown in FIG. 4A and FIG. 4B, the inner member 2 and the cage 4 can also be made of austempered graphite steel. Treatment (carburizing, etc.) prior to austempering treatment and post-austempering processes (such as grinding and formation of nitrided layer or sulfide) may also be done as required.

In the tripod type constant velocity joint shown in FIG. 5 and FIG. 6, the tripod member can also be made of austempered graphite steel. Treatment (carburizing, etc.) prior to austempering treatment and post-austempering processes (such as grinding and formation of nitrided layer or sulfide) may also be done as required.

Some of tripod type constant velocity joints have such a configuration as the rollers 9 are made up of two types of rollers, namely inner rollers and outer rollers, for the purpose of reducing the thrust induced and an inclination mechanism is provided that allows an inclination between the outer rollers and the arm 7a. The present invention can also be applied to this type of constant velocity joint.

Figure 10A:
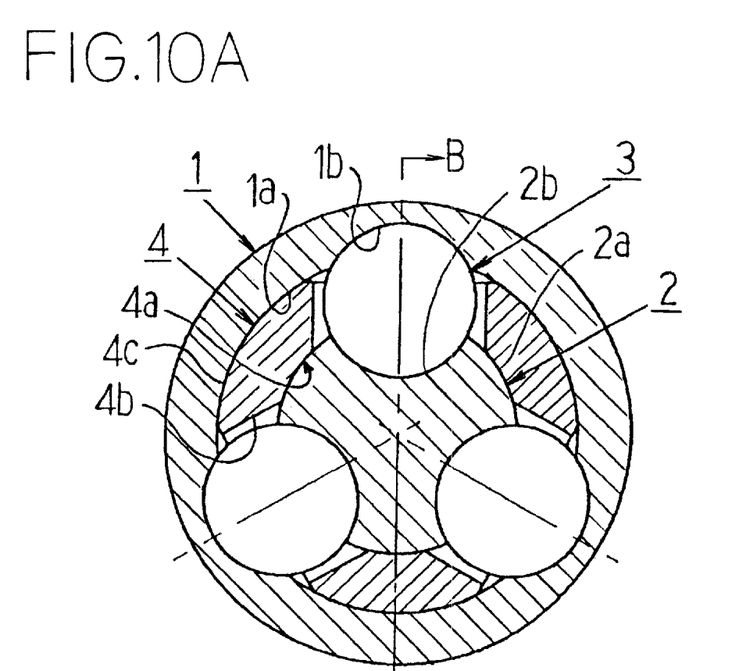
FIG. 10A is a cross sectional view of a constant velocity joint used in a steering system.
Figure 10B:
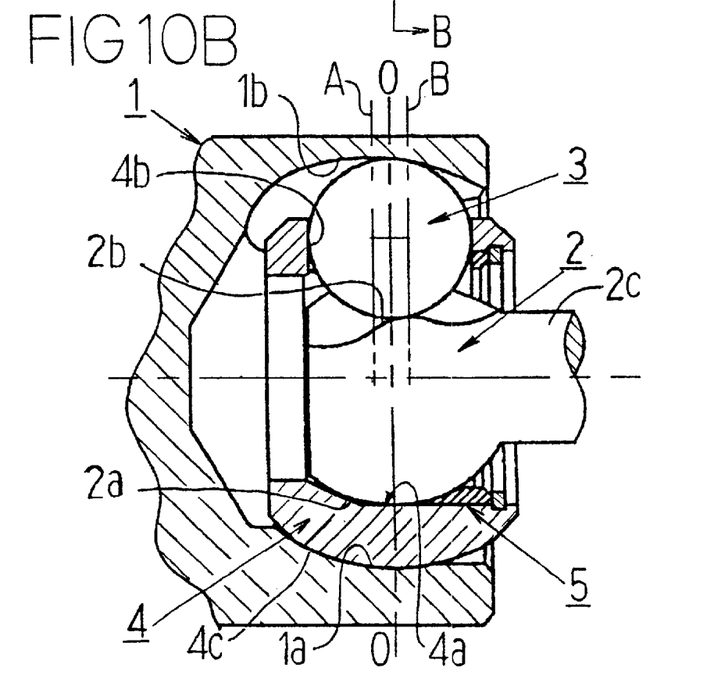
FIG. 10B is a sectional view taken along line B—B in FIG. 10A.

FIG. 10A and FIG. 10B show a fixed type constant velocity joint preferable for such applications where backlash of rotation is undesirable such as a steering system of an automobile. The present invention can also be applied to this type of constant velocity joint.

This constant velocity joint comprises an outer member 1 that has, for example, three curved guide grooves 1b formed in the axial direction on a spherical inner circumference 1a, an inner member 2 that has, for example, three curved guide grooves 2b formed in the axial direction on a spherical outer circumference 2a, torque transmitting balls 3 (in a number of three, for example) arranged in the ball track formed from the guide grooves 1b of the outer member 1 and the guide grooves 2b of the inner member 2, a cage 4 that holds the torque transmitting balls 3 and elastic means 5 interposed between the outer circumference 2a of the inner member 2 and the inner circumference 4a of the cage 4.

The outer member 1 has a cup-like shape that opens on one end thereof, and is provided with a shaft formed on the other end, which is not shown, integrally formed therewith or a separate shaft welded thereto by appropriate means. Center A of the guide groove 1b is offset from the center O of curvature of the spherical inner circumference 1a by a predetermined distance in the axial direction (toward the inside of the joint in this embodiment). The inner member 2 and the shaft portion 2c are integrally formed with each other.??? This configuration is employed in consideration of reduction of the number of parts and the man-hours required for assembly. Center B of the guide groove 2b is offset from the center O of curvature of the spherical outer circumference 2a by a predetermined distance in the axial direction (toward the opening of the joint in this embodiment). The amount of offset of the guide groove 2b is the same as the amount of offset of the guide groove 1b of the outer member 1, although the directions of the offsets are opposite (toward the inside for the guide groove 1b and toward the opening for the guide groove 2b). The cage 4 has three window-like recesses 4b that house the torque transmitting balls 3. The inner circumference 4a of the cage 4 has a cylindrical shape in a region on the opening side and a conical shape in an inner region. Shape of the inner region may also be spherical or cylindrical. The outer circumference 4c of the cage 4 is spherical (center of curvature O).

In this constant velocity joint, the center A of the guide groove 1b of the outer member 1 and the center B of the guide groove 2b of the inner member 2 are offset to the opposite sides of the center plane O of the joint that includes the centers of the balls 3 by the same distances in the axial direction. Consequently, the ball track formed by the guide groove 1b and the guide groove 2b has a wedge shape that is wider on the inside and gradually reduces toward the opening (may, on the contrary, be gradually reduced toward the inside). Since the outer circumference 2a of the inner member 2 is urged by the elastic force of the elastic means 5 toward the opposite side (inward) of the offset direction (opening side) of the center B of the guide groove 2b, the torque transmitting balls 3 are pressed toward the reduced portion of the ball track, so that the clearance between the torque transmitting balls 3 and the guide grooves 1b, 2b of the inner and outer members 1, 2 diminishes. As a result, the torque transmitting balls 3 receive a predetermined pressure in the axial direction, thus eliminating the backlash of rotation (play in the circumferential direction).

In this constant velocity joint, the outer member 1 and the inner member 2 thereof can also be made of austempered graphite steel. Treatment (carburizing, etc.) prior to austempering treatment and post-austempering processes (such as grinding and formation of nitrided layer or sulfide) may also be done as required, similarly to the case described previously.

In order to determine the type of grease suited to the constant velocity joint of the present invention, surface wear was measured with various types of grease with the SAVIN type friction wear tester in conformity with the JIS standard.

Wear was evaluated in terms of the amount of wear of the track surface of the inner race (inner member) of the double offset type constant velocity joint. The inner race was fabricated by applying cold forging to graphite steel (C: 0.59%, Si: 0.8%, Mn: 0.3%, P: 0.020%, S: 0.013%, B: 0.0015%, N: 0.0030%, Al: 0.015%), and applying machining operation, austempering treatment and then grinding of the outer spherical surface. Surface hardness was set to 55 HRC. The amount of wear of the track surface was measured after running the constant velocity joint at a rotational speed of 1700 rpm under a load torque of 206N·m (21 kgf·m) with an operation angle θ=6° for 600 hours. Friction coefficient $\mu$ of the grease was measured after running the friction wear tester at a peripheral speed of 108 m/min under a load of 12.7N (1.3 kgf) for 10 minutes.

Figure 9:
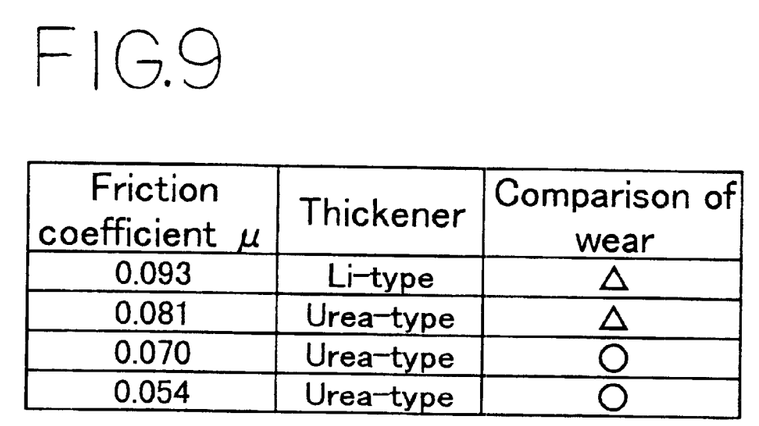
FIG. 9 shows the results of a test.

Results of the test are shown in FIG. 9. In the figure, ○ indicates a small amount of wear and Δ indicates a large amount of wear.

FIG. 9 shows that a grease containing a Urea-type thickener, particularly that of $\mu$ value not higher than 0.070 is effective in reducing the wear and improving wear resistance.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A power transmission shaft employing a constant velocity joint, wherein surface layer thereof is hardened by applying induction hardening of graphite steel in which the effect of heat reaches the core and a 2-phase structure of ferrite and martensite is formed in the core.

2. A power transmission shaft according to claim 1 wherein said graphite steel contains 0.35 to 0.70% of C, 0.4 to 2.0% of Si, 0.3 to 1.5% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

3. A power transmission shaft according to claim 2 wherein said graphite steel contains either 0.3 to 1.0 weight percent of Ni or 0.2 weight percent or less Mo or contains both added thereto.

4. A power transmission shaft according to claim 1 wherein difference between maximum and minimum values of surface hardness thereof is set to 200 Hv or less.

5. A power transmission shaft according to claim 1 wherein the core hardness thereof is set in a range from 25 to 45 HRC.

6. A power transmission shaft according to claim 1 wherein residual compressive stress in the surface thereof is set to 60 kgf/mm$^2$ or higher.

7. A power transmission shaft according to claim 1 wherein residual compressive stress in the surface thereof is made not lower than 90 kgf/mm$^2$ by shot peening.

8. A constant velocity joint comprising an outer member having a plurality of guide grooves formed on an inner circumference thereof, an inner member having a plurality of guide grooves formed on an outer circumference thereof, torque transmitting balls arranged in a plurality of ball tracks formed from the guide grooves of the outer member and the guide grooves of the inner member, and a cage for holding the torque transmitting balls, wherein
the outer member is hardened in the surface layer thereof by applying induction hardening to graphite steel and a 2-phase structure of ferrite and martensite is formed in the core thereof.

9. A constant velocity joint comprising an outer member having three track grooves formed on an inner circumference thereof and roller guide surfaces disposed in the axial direction on either side of each track groove, a tripod member having three arms extending and protruding radially, and rollers rotatably mounted via a plurality of rolling elements on the three arms of the tripod member, the rollers being guided in the axial direction of the outer member by the roller guide surfaces disposed in the axial direction on either side of the track groove, wherein
the outer member is hardened in the surface layer thereof by applying induction hardening to graphite steel and a 2-phase structure of ferrite and martensite is formed in the core thereof.

10. A constant velocity joint according to claim 8 or 9 wherein said graphite steel contains 0.5 to 0.70% of C, 0.4 to 2.0% of Si, 0.4 to 1.5% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

11. A constant velocity joint according to claim 10 wherein said graphite steel contains either 0.3 to 1.0 weight percent of Ni or 0.2 weight percent or less Mo or contains both added thereto.

12. A constant velocity joint according to claim 10 wherein the graphite grain size of said graphite steel is set to 15 $\mu$m or smaller.

13. A constant velocity joint according to claim 8 or 9 wherein the outer member is formed by forging.

14. A constant velocity joint according to claim 13 wherein the 2-phase structure of ferrite and graphite is maintained in forged skin that remains on the outer member.

15. A constant velocity joint according to claim 12 wherein difference between maximum and minimum values of surface hardness thereof is set to 200 Hv or less.

16. A constant velocity joint according to claim 8 or 9 wherein the core hardness thereof is set in a range from 25 to 45 HRC.

17. A constant velocity joint according to claim 8 or 9 wherein residual compressive stress in the surface thereof is set to 50 kgf/mm$^2$ or higher.

18. A constant velocity joint according to claim 8 or 9 wherein residual compressive stress in the surface thereof is made not lower than 80 kgf/mm$^2$ by shot peening.

19. A constant velocity joint according to claim 8 or 9 wherein a grease having a friction coefficient $\mu$ of 0.07 or lower is used.

20. A constant velocity joint comprising an outer member having a plurality of guide grooves formed on an inner circumference thereof, an inner member having a plurality of guide grooves formed on an outer circumference thereof, torque transmitting balls arranged in a plurality of ball tracks formed from the guide grooves of the outer member and the guide grooves of the inner member, and a cage for holding the torque transmitting balls, wherein the cage is made of austempered graphite steel having a bainite structure, wherein the carbon content in the austempered graphite steel is limited to 0.45 to 0.75% by weight.

21. A constant velocity joint comprising an outer member having a plurality of guide grooves formed on an inner circumference thereof, an inner member having a plurality of guide grooves formed on an outer circumference thereof, torque transmitting balls arranged in a plurality of ball tracks formed from the guide grooves of the outer member and the guide grooves of the inner member, and a cage for holding the torque transmitting balls, wherein the inner member is made of austempered graphite steel having a bainite structure, wherein the carbon content in the austempered graphite steel is limited to 0.45 to 0.75% by weight.

22. A constant velocity joint comprising an outer member having three track grooves formed on an inner circumference thereof and roller guide surfaces disposed in the axial direction on either side of each track groove, a tripod member having three arms extending and protruding radially and rollers rotatably mounted via a plurality of rolling elements on the three arms of the tripod member, the rollers being guided in the axial direction of the outer member by the roller guide surfaces located on either side of the track groove, wherein the tripod member is made of austempered graphite steel having a bainite structure, wherein the carbon content in the austempered graphite steel is limited to 0.45 to 0.75% by weight.

23. A constant velocity joint comprising an outer member having guide grooves of curved shape formed in the axial direction on a spherical inner circumference thereof, an inner member having guide grooves of curved shape formed in the axial direction on a spherical outer circumference thereof, torque transmitting balls arranged in ball track formed from the guide grooves of the outer member and the guide grooves of the inner member, and a cage for holding the torque transmitting balls, a center of the guide grooves of the outer member and a center of the guide grooves of the inner member being offset to the opposite sides in the axial direction by the same distances with regards to a bisecting plane of the joint including centers of the torque transmission balls, the ball track being gradually reduced toward an opening or inner end of the joint, and the torque transmitting balls are elastically pressed toward reduced side of the ball track, wherein the outer member is made of austempered graphite steel having a bainite structure, wherein the carbon content in the austempered graphite steel is limited to 0.45 to 0.75% by weight.

24. A constant velocity joint according to any one of claims 20 to 23 wherein said graphite steel contains 0.45 to 0.75% of C, 0.4 to 2.0% of Si, 0.2 to 1.0% of Mn, 0.025% or less S, 0.02% or less P, 0.01 to 0.1% of Al, 0.001 to 0.004% of B and 0.002 to 0.008% of N by weight as the basic components, with the rest comprising Fe and inevitable impurities.

25. A constant velocity joint according to claim 24 wherein said graphite steel contains either 0.3 to 1.0 weight percent of Ni or 0.2 weight percent or less Mo or contains both added thereto.

26. A constant velocity joint according to any one of claims 20 to 23 wherein graphite grain size of said graphite steel is set to 15 $\mu$m or less.

27. A constant velocity joint according to any one of claims 20 to 23 wherein the core hardness thereof is set in a range from 50 to 60 HRC.

28. A constant velocity joint according to claim 24 wherein a carburized layer is formed on the surface thereof before applying austempering thereto.

29. A constant velocity joint according to claim 24 wherein a nitrided layer is formed on the surface thereof after applying austempering thereto.

30. A constant velocity joint according to claim 24 wherein sulfide is formed on the surface thereof after applying austempering thereto.

31. A constant velocity joint according to claim 24 wherein a grease having a friction coefficient $\mu$ of 0.07 or lower is used.

* * * * *